US008964814B2

(12) United States Patent
Rowitch

(10) Patent No.: US 8,964,814 B2
(45) Date of Patent: Feb. 24, 2015

(54) METHODS AND APPARATUSES FOR DEMODULATING MULTIPLE CHANNEL SATELLITE POSITIONING SYSTEM SIGNALS

(75) Inventor: Douglas Neal Rowitch, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 763 days.

(21) Appl. No.: 12/716,994

(22) Filed: Mar. 3, 2010

(65) Prior Publication Data

US 2011/0216811 A1 Sep. 8, 2011

(51) Int. Cl.
*H04B 1/00* (2006.01)
*G01S 19/30* (2010.01)
*G01S 19/37* (2010.01)

(52) U.S. Cl.
CPC *G01S 19/30* (2013.01); *G01S 19/37* (2013.01)
USPC ........................................................ 375/150

(58) Field of Classification Search
CPC .................................. G01S 19/37; G01S 19/30
USPC ......... 375/130, 143, 147, 148, 150, 322, 324, 375/326, 343, 344; 342/357.73, 357.74, 342/357.77, 450, 453
See application file for complete search history.

(56) References Cited

U.S. PATENT DOCUMENTS

| 6,987,799 | B2 | 1/2006 | McDonough et al. | |
| 7,336,640 | B2 | 2/2008 | McDonough et al. | |
| 7,376,206 | B1 * | 5/2008 | Simic et al. | 375/329 |
| 2004/0184513 | A1 | 9/2004 | Lundby et al. | |
| 2006/0031696 | A1 * | 2/2006 | King et al. | 713/400 |
| 2007/0057841 | A1 * | 3/2007 | McBurney et al. | 342/357.15 |
| 2007/0071072 | A1 * | 3/2007 | Banister et al. | 375/148 |
| 2007/0201537 | A1 * | 8/2007 | De Wilde et al. | 375/147 |
| 2009/0189808 | A1 * | 7/2009 | Chen | 342/357.12 |
| 2009/0279592 | A1 * | 11/2009 | Pratt et al. | 375/148 |
| 2009/0309791 | A1 | 12/2009 | Chen | |
| 2011/0006947 | A1 * | 1/2011 | Pon et al. | 342/357.69 |
| 2011/0279318 | A1 * | 11/2011 | Lennen | 342/357.77 |

FOREIGN PATENT DOCUMENTS

| JP | 2005265476 A | 9/2005 |
| JP | 2007267087 A | 10/2007 |
| JP | 2009542072 A | 11/2009 |
| WO | WO-2007148081 A1 | 12/2007 |

OTHER PUBLICATIONS

Daniele Borio et al., "Collaborative Code Tracking of Composite GNSS Signals", IEEE Journal of Selected Topics in Signal Processing, IEEE, US, vol. 3, No. 4, Aug. 1, 2009, pp. 613-626, XP011264287, ISSN: 1932-4553.
International Search Report and Written Opinion—PCT/US2011/026919, ISA/EPO—May 27, 2011.

(Continued)

*Primary Examiner* — Syed Haider
(74) *Attorney, Agent, or Firm* — Michael Johnson

(57) ABSTRACT

Methods and apparatuses are provided which may be enabled within and/or for use with a Satellite Positioning System (SPS) receiver and/or other like apparatuses or device(s) to demodulate a first channel portion of a multiple channel SPS signal based, at least in part, on a second channel portion of the multiple channel SPS signal.

33 Claims, 2 Drawing Sheets

(56) References Cited

OTHER PUBLICATIONS

Won J. H., Anghileri M., Eissfeller B., "Optimum Data Rate and Signal Power Split for Next generation GNSS Architectures", 22nd International Meeting of the Satellite Division of the Institute of Navigation, Sep. 25, 2009, pp. 2942-2955, XP002637397, Savannah, U.S.A.

Taiwan Search Report—TW100107188—TIPO—May 23, 2013.

* cited by examiner

METHODS AND APPARATUSES FOR DEMODULATING MULTIPLE CHANNEL SATELLITE POSITIONING SYSTEM SIGNALS

BACKGROUND

1. Field

The subject matter disclosed herein relates to electronic devices, and more particularly to methods and apparatuses for use in electronic devices enabled to receive satellite positioning system (SPS) signals.

2. Information

Among the increasingly popular wireless technologies today are navigation systems and like configured devices, and in particular those devices that acquire signals from a satellite positioning system (SPS) which may, for example, include the Global Positioning System (GPS) and/or one or more other like Global Navigation Satellite Systems (GNSSs). Based, at least in part, on acquired SPS signals, such devices may themselves and/or with the assistance of other devices estimate a current location and/or establish other positional/navigational information. For example, estimated pseudorange information, estimated geographical location, estimated altitude, and/or estimated speed may be established, often with significant accuracy.

Some SPS signals may include multiple channels, such as, for example, a data channel and a pilot channel. Here, for example, a data channel may provide navigation information for use by a receiving device to estimate current location and/or establish other positional/navigational information. A pilot channel typically does not carry any navigation information but is provided, for example, to aid a receiving device in acquiring and tracking the SPS signal.

SUMMARY

In accordance with certain aspects, techniques are provided herein which may be implemented through various methods and apparatuses which may be enabled within and/or for use with a Satellite Positioning System (SPS) receiver and/or other like apparatuses or device(s) to demodulate a first channel portion of a multiple channel SPS signal based, at least in part, on a second channel portion of the multiple channel SPS signal.

For example, in certain implementations a method for use in an electronic device may include receiving at least one SPS signal comprising at least two channel portions including a first channel portion based on a first signal modulated using a SPS data sequence and a second channel portion based on a second signal that is not modulated using the SPS data sequence, and demodulating the first channel portion based, at least in part, on the second channel portion.

In certain example implementations, a method may also include establishing a first channel in-phase correlation output signal and a first channel quadrature correlation output signal using the first channel portion, and establishing a second channel in-phase correlation output signal and a second channel quadrature correlation output signal using the second channel portion. Here, for example, second channel in-phase and quadrature correlation output signals may be filtered over a period of time, e.g., wherein the period of time is greater than a bit duration associated with the first channel portion.

In certain example implementations, a method may also include obtaining symbols within the first channel signal using the second channel signal based, at least in part, on establishing a dot product of first channel in-phase and quadrature output signals with second channel in-phase and quadrature output signals, e.g., a dot product between (DI, DQ) and (PI, PQ).

In certain example implementations, the transmitted power of an SPS signal may be allocated substantially equally between the first and second channel portions. In certain other example implementations, the transmitted power of an SPS signal may be allocated unequally between the first and second channel portions.

In certain example implementations, a first channel portion may comprise a data channel and the second channel portion comprises a pilot channel. In certain example implementations, an SPS may comprise at least one global navigation satellite system (GNSS) and/or a data sequence may comprise SPS navigation data.

In accordance with certain other example implementations, an apparatus may be provided which includes an SPS receiver to receive at least one SPS positioning signal comprising at least two channel portions including a first channel portion based on a first signal modulated using a SPS navigation data sequence (e.g., the navigation and/or other information transmitted by the SPS satellite) and a second channel portion based on a second signal that is not modulated using the SPS navigation data sequence, and a demodulator to demodulate the first channel portion based, at least in part, on the second channel portion.

In certain example implementations, an SPS receiver may further comprise one or more correlators to establish a first channel in-phase correlation output signal and a first channel quadrature correlation output signal using the first channel portion and a second channel in-phase correlation output signal and a second channel quadrature correlation output signal using the second channel portion.

In accordance with certain other example implementations, an article of manufacture may be provided which comprises a computer readable medium having computer implementable instructions stored thereon which if implemented by one or more processing units in a special purpose electronic device operatively enable the electronic device to access at least one received SPS positioning signal comprising at least two channel portions including a first channel portion based on a first signal modulated using a SPS data sequence and a second channel portion based on a second signal that is not modulated using the SPS data sequence, and demodulate the first channel portion based, at least in part, on the second channel portion.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Figure 1:
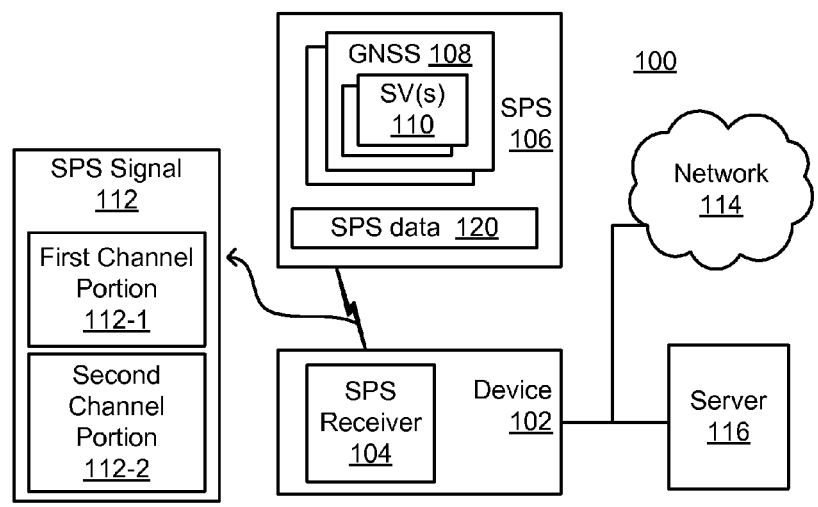
FIG. 1 is a schematic block diagram illustrating an exemplary signaling environment that includes an electronic device having at least one SPS receiver enabled to demodulate a first channel portion of a multiple channel SPS signal using a second channel portion, in accordance with an implementation.

Non-limiting and non-exhaustive aspects are described with reference to the following figures, wherein like reference numerals refer to like parts throughout the various figures unless otherwise specified.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

In the following detailed description, numerous specific details are set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

Some example techniques are described herein which may be enabled within and/or for use with at least one Satellite Positioning System (SPS) receiver and/or other like apparatuses or device(s) to demodulate a first channel portion of a multiple channel SPS signal using a second channel portion. Such techniques may be used instead of and/or in addition to other demodulation techniques, e.g., differential data demodulation, coherent data demodulation, and/or the like.

As used herein, the terms "SPS signal" and "multiple channel SPS signal" may be used interchangeably and unless otherwise specified are meant to be the same. With this in mind, the terms first channel portion and second channel portion as used herein are intended to identify two different portions (e.g., channels) that may be included in a transmitted SPS signal. The first channel portion may be based, at least in part, on a first signal that is modulated using a SPS data sequence. The second channel portion may be based, at least in part, on a second signal that is not modulated using the SPS data sequence. By way of example but not limitation, in certain example implementations the first channel portion may include a data channel and the SPS data sequence may include an SPS navigation message and/or the like, and the second channel portion may include a pilot channel. Some exemplary, non-limiting, SPS signals are presented below which illustrate some techniques for generating and transmitting such multiple channel SPS signals.

With regard to certain exemplary devices, a SPS may include a system of transmitters positioned to enable entities to determine their location on or above the Earth based, at least in part, on signals received from the transmitters. Such a transmitter may transmit an SPS signal marked with a repeating pseudo-random noise (PN) code of a set number of chips and may be located on ground based control stations, user equipment and/or space vehicles. A "space vehicle" (SV) as referred to herein relates to an object that is capable of transmitting signals to receivers on or above the Earth's surface. In one particular example, such an SV may include a geostationary satellite. Alternatively, an SV may include a satellite traveling in an orbit and moving relative to a stationary position on the Earth. However, these are merely examples of SVs and claimed subject matter is not limited in these respects.

In a particular example, such transmitters may be located on SVs such as Earth orbiting satellites. For example, a satellite in a constellation of a GNSS such as Global Positioning System (GPS), Galileo, Glonass, Compass, and/or the like may transmit a signal marked with a PN code that is distinguishable from PN codes transmitted by other satellites in the constellation. To estimate a location at a receiver, a device may be enabled to determine pseudorange measurements to SVs "in view" of the receiver using well known techniques based, at least in part, on detections of PN codes in signals received from the SVs.

GNSS constellations, such as GPS and GLONASS transmit spread spectrum signals that are modulated with BPSK navigation data. For example, the GPS L1 C/A waveform includes a repeated 1 millisecond duration 1023 chip Gold code that is modulated by 50 bps BPSK information bits associated with a navigation message.

A number of new and/or "modernized" SPS signals are expected to become available. By way of example but not limitation, GPS is expected to transmit L2C, L5, and L1C SPS signals, Galileo is expected to transmit L1 OS and E5 SPS signals, and Compass and GLONASS are also expected to transmit other new and/or "modernized" SPS signals.

Several of these new SPS signals are expected to allocate the transmitted SPS signal's power between a first channel portion (e.g., a data channel) and second channel portion (e.g., a pilot channel). Such pilot channel may, for example, be used (as appears to be the initial intention) to aid in SPS signal acquisition and/or SPS signal tracking. The transmitted signal power may, for example, be allocated substantially evenly between data and pilot channels, as is the case with GPS L2C. In other examples, the transmitted signal energy may be allocated in some other manner. Here, for example, an example GPS L1C signal may use approximately 25% of the transmitted signal power for the data channel and approximately 75% for the pilot channel.

Both data and pilot channels may, for example, continue to make use of spread spectrum pseudo-random codes, which tends to minimize or otherwise reduce correlation between different simultaneously transmitted SPS signals. In certain example, implementations, both data and pilot channels may use the same spreading code. In other example implementations, data and pilot channels may use different spreading codes. In certain example implementations, data channels may employ the use of advanced Forward Error Correcting (FEC) encoding and/or other like techniques, which may improve the ability of a receiver to decode and/or otherwise recover the navigation messages.

It has been recognized by others that there may be some additional benefits to using the pilot channel for signal acquisition. For example, it has been recognized by others that one benefit may be to allow for an arbitrarily long coherent integration process, e.g., one that is not necessarily limited to a 20.0 ms or other like bit duration. For example, it has been recognized by others that, with a pilot channel there may be no need to synchronize acquisition/tracking integrations to a signal bit edge. Still further, it has been recognized by others that using a pilot channel for signal acquisition may allow for improved code and carrier tracking loop performance. For additional reference, see, e.g., Van Dierendonck, A. J. (1995), *GPS Receivers*; B. Parkinson and J. J. Spilker, Jr., eds., *Global Positioning System: Theory and Applications*, Volume 1, Chapter 8. American Institute of Aeronautics and Astronautics, Inc., Washington D.C., USA.

In accordance with an aspect of the present description it is recognized that there may be additional benefits if the pilot channel may also and/or alternatively be employed to aid in demodulating the data channel. However, before illustrating such techniques, some examples of known SPS modulation and demodulation techniques are reviewed.

Example GPS Differential Data Demodulation

Legacy GNSS systems such as GPS and GLONASS transmit BPSK modulated signals. Assuming a baseband correlation processor is perfectly tuned to be sampling at the correct time and frequency corresponding to a GPS signal of interest, the output signal of a tracking correlator after despreading and accumulation over 20 periods of the GPS PRN code (e.g., coherent integration over the 20 ms GPS bit duration) can be modeled as:

$$D_{I_k} = (A \cdot b_k \cdot \cos \phi_k + n_{I_k})$$

$$D_{Q_k} = (A \cdot b_k \cdot \sin \phi_k + n_{Q_k}) \quad (1)$$

where, $D_{I_k}$ & $D_{Q_k}$ are the in-phase and quadrature correlation output signals at time k, A is the gain on the accumulation, $b_k$ is the desired bit in the 50 bps navigation stream at time k, $\phi_k$ is the carrier phase of the down-converted signal at time k, and $n_{I_k}$ & $n_{Q_k}$ are the in-phase and quadrature Gaussian noise terms.

As the GPS data stream is differentially encoded, classical differential demodulation may be applied to extract a differential bit stream. This may be accomplished, for example, by computing a dot product between the current coherent accumulations at time k with the previous accumulations at time k−1.

The dot product calculation removes the phase of the signal, conditioned on the assumption that the phase is relatively constant across the duration of two consecutive bits, as follows:

$$\phi_k \approx \phi_{k-1} \equiv \phi \quad (2)$$

The differential demodulation dot product is given by:

$$\begin{aligned} \text{Dot}_k &= D_{I_k} \cdot D_{I_{k-1}} + D_{Q_k} \cdot D_{Q_{k-1}} \\ &= (A \cdot b_k \cdot \cos\phi_k + n_{I_k}) \cdot (A \cdot b_{k-1} \cdot \cos\phi_{k-1} + n_{I_{k-1}}) + \\ &\quad (A \cdot b_k \cdot \sin\phi_k + n_{Q_k}) \cdot (A \cdot b_{k-1} \cdot \sin\phi_{k-1} + n_{Q_{k-1}}) \\ &= A^2 \cdot b_k \cdot b_{k-1} (\cos^2\phi + \sin^2\phi) + N \\ &= A^2 \cdot b_k \cdot b_{k-1} + N \end{aligned} \quad (3)$$

where, $b_k \cdot b_{k-1}$ is the desired differential output signal, and N includes the three noise terms from the dot product.

The decoded sequence $\{\text{Dot}_k\}$ may then be provided to a differential decoder that is enabled to recover the SPS navigation data.

Example Ideal Coherent Data Demodulation

As an intellectual exercise, suppose that a phase, $\phi_k$, of the signal were known perfectly. In this case, one need not use the previous received symbol to demodulate the current symbol. Rather one may compute the coherent detection:

$$\begin{aligned} \text{IdealDot}_k &= D_{I_k} \cdot A \cdot \cos\phi_k + D_{Q_k} \cdot A \cdot \sin\phi_k \\ &= (A \cdot b_k \cdot \cos\phi_k + n_{I_k}) \cdot A \cdot \cos\phi_k + \end{aligned} \quad (4)$$

-continued
$$\begin{aligned} &\quad (A \cdot b_k \cdot \sin\phi_k + n_{Q_k}) \cdot A \cdot \sin\phi_k \\ &= A^2 \cdot b_k (\cos^2\phi_k + \sin^2\phi_k) + N'' \\ &= A^2 \cdot b_k + N'' \end{aligned}$$

One difference in these two candidate dot product expressions is in particular noise terms, wherein, for example, the power in the noise terms and/or quantity of noise terms will likely be less in the above coherent detection expression.

Of course, in practice, there is no perfect coherent reference available for demodulation, however this concept may further the understanding in the sections that follow.

In certain example implementations, one may implement coherent data demodulation, for example, by employing a PLL/costas type loop and/or the like. Example coherent data demodulation may, for example, be similar to the example ideal coherent data demodulation in that a process for estimating the cos/sin pair may be provided, but wherein the phase phi_k may not perfect and noise terms may be provided. Such alternative example implementations may be employed, for example, for use with legacy BPSK signals.

By way of example but not limitation, legacy GNSS systems such as GPS and GLONASS may also employ coherent data demodulation where the coherent demodulation reference is obtained from a PLL or Costas type of tracking loop. This estimation process, unlike differential demodulation, may produce an estimate of the current phase, which also does not depend on the previous data symbol. Such loops may have an ambiguous 180 degree phase offset (e.g., may either be perfectly in-phase or out-of-phase with the received data symbols).

Thus, let the output of a coherent estimation loop be given by:

$$D_{CI_k} = (A \cdot s \cdot \cos \hat{\phi}_k + n_{CI_k})$$

$$D_{CQ_k} = (A \cdot s \cdot \sin \hat{\phi}_k + n_{CQ_k})$$

where, $D_{CI_k}$ & $D_{CQ_k}$ are the in-phase and quadrature estimates from the coherent tracking loop at time k, A is the gain on the loop, assuming the same as the incoming signal gain for simplicity s is the unknown sign (+/−1) of the tracking loop, $\hat{\phi}_k$ is the estimated phase from the coherent tracking loop at time k, and $n_{CI_k}$ & $n_{CQ_k}$ are the in-phase and quadrature Gaussian noise terms from the tracking loop.

The coherent demodulation can be expressed as the dot product between the received data symbols at time k and the coherent tracking loop estimates at time k.

This dot product calculation similarly removes the phase of the signal, conditioned on the assumption that the coherent tracking loop is correctly estimating the phase of the incoming signal; e.g., $\phi_k \approx \hat{\phi}_k \equiv \phi$ The coherent demodulation dot product may be given by:

$$\begin{aligned} \text{CohDot}_k &= D_{I_k} \cdot D_{CI_k} + D_{Q_k} \cdot D_{CQ_k} \\ &= (A \cdot b_k \cdot \cos\phi_k + n_{I_k}) \cdot (A \cdot s \cdot \cos\hat{\phi}_k + n_{CI_{k-1}}) + \\ &\quad (A \cdot b_k \cdot \sin\phi_k + n_{Q_k}) \cdot (A \cdot s \cdot \sin\hat{\phi}_k + n_{CQ_{k-1}}) \\ &= A^2 \cdot s \cdot b_k (\cos^2\phi + \sin^2\phi) + N' \\ &= A^2 \cdot s \cdot b_k + N' \end{aligned}$$

where, $b_k$ is the desired output navigation bit, and

N' includes the three noise terms from the dot product.

Here, for example, an unknown 180 degree phase ambiguity, represented by "s" may be common to consecutive demodulated symbols, e.g., as long as the carrier tracking loop remains in lock. As such, for example, established techniques may be applied to resolve the sign ambiguity in the navigation data decoder, leveraging properties inherent in the navigation data itself By way of further example, in GPS, navigation messages are encoded using modified hamming codes that allow one to recover the correct navigation information upon receipt of either the exact codeword transmitted or the negative (e.g., flip all of the bits) of such codeword.

Example Modern GNSS Signals

Some non-limiting examples of modern SPS signals will now be presented. It should be understood that the techniques provided herein may be applied to these and/or other SPS signals. For example, in certain example implementations the pilot and data channels may be transmitted simultaneously (e.g., in parallel), while in other example implementations the pilot and data channels may be time-division multiplexed (e.g., transmitted serially at given durations).

Example GPS L2C Multiple Channel SPS Signal

An SV may include a modulator for GPS L2C. Here, for example, an SV may generate a moderate length code (CM) and long code (CL). These two codes may be multiplexed (chip by chip) to form a composite code of duration 1.5 seconds. A new defined stream of navigation (CNAV) information (25 bps) may be FEC coded using a rate 1/2 convolutional code. This 50 bps stream of encoded symbols modulates just the chips of the CM code. Since the CM code is 10,230 chips and the CM code occupies only even chips, the duration of the transmitted code symbol is 20 ms, as is the case with GPS L1 C/A, given that the chipping rate for L2C is also 1.023 MHz.

Thus, while observing the final modulated waveform, the odd chips represent the pilot channel. The even chips represent the data channel. An SPS receiver enabled to process the L2C signal may include correlation circuitry to provide coherent (I and Q) accumulations separately for the pilot and data streams (e.g., using reference CM and CL codes as respective inputs to a correlator engine).

I and Q coherent output signals from the data channel may appear to be essentially the same as the I and Q coherent output signals from a conventional GPS L1 C/A demodulator, except that: (1) the symbols may be 3 dB weaker in SNR as half of the chips are excluded from the bit accumulation; (2) the symbols may be convolutionally encoded, offering on the order of a 5 dB coding gain over the legacy GPS L1 C/A navigation stream; and, (3) the L2C signal's total transmit power may be weaker than an L1 C/A signal's total transmit power by some factor, e.g., on the order of 1-2 dB.

Here, some form of differential and/or coherent data demodulation may be applied to the coherent symbols from the data channel (independent of the pilot channel) with relatively few modifications.

Example GPS L5 Multiple Channel SPS Signal

GPS L5 uses a 10× faster chipping rate of 10.23 MHz. Here, rather than time multiplexed pilot and data channels, the pilot and data are transmitted in parallel using different spreading sequences in the in-phase and quadrature channels. For L5, an FEC encoded navigation message is used to modulate the PN code on in the in-phase or "I" channel, whereas the PN code on the "Q" channel is transmitted un-modulated. Neuman-Hoffman codes also modulate the PN codes in the I and Q channels. These length 10 and 20 symbol codes do not change for different satellites (e.g., these represent synchronization codes common to all satellites); only the PN codes and navigation data change between different satellites.

An SPS receiver enabled to acquire a GPS L5 signal may, for example, employ correlators using the reference "I" and "Q" PN codes to recover the pilot and data channels similar to the example L2C case above.

Other Example Multiple Channel SPS Signals

One can easily extend the above analyses to other modern signals wherein there exist distinct first and second channel portions in the transmitted SPS signal. A modern SPS receiver adapted to track such signals may, for example, output a stream of coherent (I and Q) accumulations (e.g., correlation output signals) for both channels.

The GPS L2C and L5 examples above illustrate, respectively, a time multiplexed pilot and data channel in a BPSK waveform, and a simultaneous pilot and data channel in a QPSK waveform. While the GPS L2C example uses chip by chip multiplexing of the pilot and data channels, in general, the time-multiplexing may take other forms. For example, two chips pilot, then two chips data may be employed (still equal power in pilot and data channels), or three chips pilot, one chip data (75% power in pilot, 25% in data), or any other variation in the time-multiplexing option.

GPS L5 opts to use different PN codes to orthogonalize simultaneous pilot and data channels, such that they could be separately detected and processed. Other options also exist, such as using a common PN code with pilot and data channels further modulated by some orthogonalizing function such as a Walsh function (e.g., ++ sequence for pilot +− sequence for data). Moreover, the power allocation between the pilot and data channels need not be equal; a larger percentage of power may be allocated to the pilot or the data. These are just some examples and claimed subject matter is not necessarily limited to BPSK and QPSK. For example, in certain implementations, the techniques provided herein may be applied for use with 8-PSK or QAM signals, and/or the other like signals regardless of the modulation, as long as there are separable pilot and data channels modulating the same carrier.

Attention is now drawn to FIG. 1, which is a block diagram illustrating an environment 100 that may include various computing and communication resources. This example implementation may be enabled to provide at least some form of navigation/positioning services in accordance with certain exemplary implementations of present description. This example implementation may also (optionally) be enabled to provide at least some form of communication services in accordance with certain further exemplary implementations of present description.

As for navigation/positioning services, for example, as shown in FIG. 1 an SPS 106 may include one or more GNSS 108, each of which may include a different plurality of SVs 110 that may transmit different SPS signals 112 that may be received and acquired by a device 102 having at least one SPS receiver 104. Here, at least one of the SPS signals may include multiple channel portions.

By way of example but not limitation, device 102 may include a mobile device such as a cellular phone, a smart phone, a personal digital assistant, a portable computing device, a navigation unit, and/or the like or any combination thereof. In other example implementations, device 102 may take the form of a machine that is mobile or stationary. In still other example implementations, device 102 may take the form of one or more integrated circuits, circuit boards, and/or the like that may be operatively enabled for use in another device. Indeed, in certain example implementations, device 102 may take the form of an SPS receiver 104.

In certain implementations, one or more other servers 116 and/or like devices may be provided and enabled to provide and/or otherwise exchange information in the form of data signals to/with device 102. Such information may include various types of data and/or instructions for use by device 102. In certain example implementations, such data and/or instructions may include or otherwise be of support in demodulating channel portions of a multiple channel SPS signal 112 transmitted by an SV 110. As illustrated, in certain example implementations, SPS signal 112 may include at least a first channel portion 112-1 and a second channel portion 112-2. First channel portion 112-1 may be modulated by SPS data 120. SPS data 120 may, for example, include an SPS navigation message and/or the like that may be of use by device 102.

In certain implementations environment 100 may further include various computing and communication resources enabled to provide communication and/or other information processing services with respect to device 102. Thus, for example, environment 100 may be representative of any system(s) or a portion thereof that may include at least one device 102 enabled to transmit and/or receive signals to/from at least one communication network 114.

Device 102 may, for example, be enabled for use with various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, for example.

Techniques described herein may be used with an "SPS" that includes any one of several GNSS and/or combinations of GNSS. Furthermore, such techniques may be used with positioning systems that utilize pseudolites or a combination of SVs and pseudolites. Pseudolites may include ground-based transmitters that broadcast a PN code or other ranging code (e.g., similar to a GPS or CDMA cellular signal) modulated on an L-band (or other frequency) carrier signal, which may be synchronized with system time (e.g., an SPS time). Such a transmitter may be assigned a unique PN code so as to permit identification by a remote receiver. Pseudolites may be useful, for example, to augment an SPS in situations where SPS signals from an orbiting SV might be unavailable, such as in tunnels, mines, buildings, urban canyons or other enclosed areas. Another implementation of pseudolites is known as radio-beacons. The term "SV", as used herein, is intended to include pseudolites, equivalents of pseudolites, and possibly others. The terms "SPS signals" and/or "multiple channel SPS signals", as used herein, is intended to include SPS-like signals from pseudolites or equivalents of pseudolites.

With this in mind and in accordance with certain aspects, some exemplary methods and apparatuses will now be described, which may be implemented in one or more devices, such as device 102, to provide demodulation of a first channel portion based, at least in part, on a second channel portion of an SPS signal.

Figure 2:
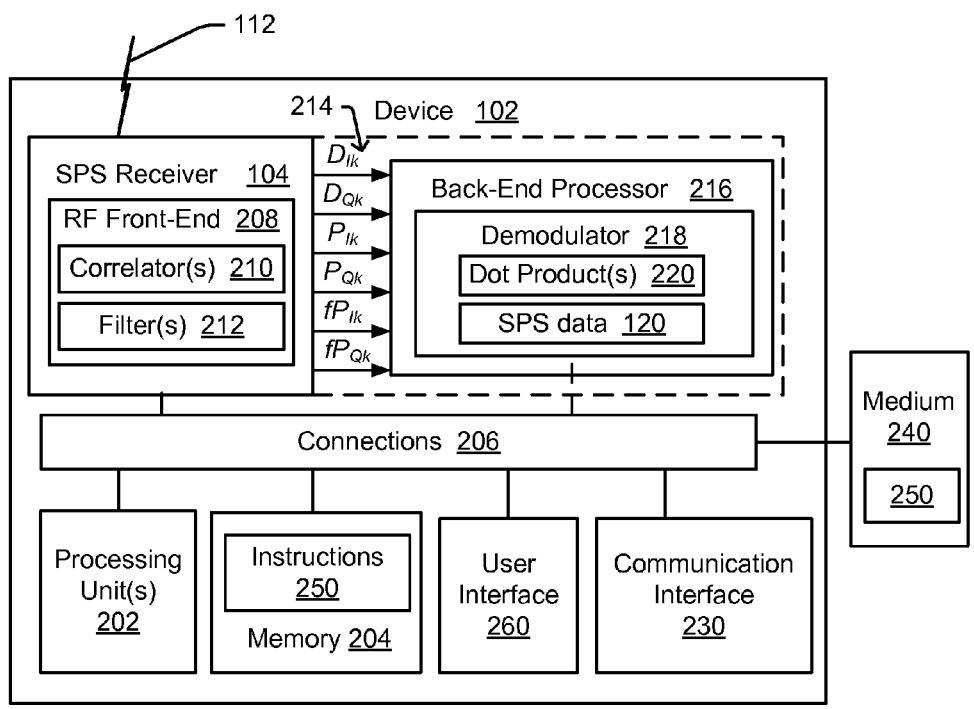
FIG. 2 is a schematic block diagram illustrating certain features of an exemplary electronic device, for example as in FIG. 1, in accordance with an implementation.

As illustrated in the exemplary schematic block diagram of FIG. 2, in certain example implementations, device 102 may include an SPS receiver 104 enabled to receive an RF signal that includes at least one SPS signal 112. SPS receiver 104 may include, for example, an RF front-end circuit 208 that may be coupled to a back-end processor 216. In this example, back-end processor 216 is illustrated as being separate from SPS receiver 104. This is done to illustrate to the reader that back-end processor 216 may, in certain designs be similar in configuration and/or function to processing unit 202. As illustrated by the dashed line extending SPS receiver 104, in certain other implementations, back-end processor 216 may be part of SPS receiver 104.

Front-end processor 208 may, for example, include one or more correlators (e.g., a correlator engine) enabled to process SPS signal 112 and provide correlation output signals 214 based thereon. Thus, for example, SPS receiver 104 may establish a first channel in-phase correlation output signal ($D_{Ik}$), a first channel quadrature correlation output signal ($D_{Qk}$), a second channel in-phase correlation output signal ($P_{Ik}$), and a second channel quadrature correlation output signal ($P_{Qk}$), which may be provided to or otherwise accessed by back-end processor 216. In certain examples, as described in greater detail below, second channel in-phase correlation output signal ($P_{Ik}$), and second channel quadrature correlation output signal ($P_{Qk}$) may be processed using one or more filters 212 enabled to filter and/or otherwise smooth the second channel correlation output signals over a period of time, which may, for example, increase signal to noise ratios thereof. Hence, for example, SPS receiver 104 may establish filtered second channel in-phase correlation output signal ($fP_{Ik}$), and a filtered second channel quadrature correlation output signal ($fP_{Qk}$).

Back-end processor 216 (and/or other like processing unit 202) may, for example, include a demodulator 218 that is enabled to access correlation output signals 214 and based, at least in part, thereon demodulate first channel portion 112-1 to recover SPS data 120. As described in greater detail below, in certain example implementations demodulator 218 may selectively establish one or more dot products 220 based on correlation output signals 214. Such dot products 220 may then be used to demodulate first channel portion 112-1 and as such recover SPS data 120.

Device 102 may also include, for example, one or more processing units 202 that may be enabled to initiate, perform, and/or otherwise support one or more functions associated with demodulator 218. Thus, for example, processing unit(s) 202 may include and/or take the form of back-end processor 216. In other example implementations, e.g., as illustrated in FIG. 2, processing unit(s) 202 may be provided in addition to back-end processor 216 and may provide additional functionality to device 102. For example, processing unit(s) 202 may be enabled to support certain navigation/positioning, communication, and/or other computing processes. As such, for example, processing unit(s) 202 may access information stored in memory 204. In certain example implementations, processing unit(s) 202 may be responsive to instructions 250, which may be stored in memory 204.

As illustrated in FIG. 2 an article of manufacture represented here by a computer readable medium 240 may be provided and accessed by processing unit 202, for example. As such, in certain example implementations, the methods and/or apparatuses may take the form in whole or part of a computer readable medium 240 that may include computer implementable instructions 250 stored thereon, which if executed by at least one processing unit, a back-end processor, and/or other like circuitry enable electronic device 102 to become a specialized electronic device.

One or more of the circuits and/or functions as illustrated in the example device 102 may be implemented in hardware, firmware, or a combination of hardware (and/or firmware) with software. Processing unit(s) 202 and/or back-end processor 216 may, for example, be representative of one or more circuits configurable to perform at least a portion of a data computing procedure or process. By way of example but not limitation, processing unit(s) 202 and/or back-end processor 216 may include one or more processors, controllers, microprocessors, microcontrollers, application specific integrated circuits, digital signal processors, programmable logic devices, field programmable gate arrays, and the like, or any combination thereof.

Memory 204 is representative of any data storage mechanism. Memory 204 may include, for example, a primary memory and/or a secondary memory. Primary memory may include, for example, a random access memory, read only memory, etc. While illustrated in this example as being separate from processing unit(s) 202, it should be understood that all or part of a primary memory may be provided within or otherwise co-located/coupled with processing unit(s) 202. Secondary memory may include, for example, the same or similar type of memory as primary memory and/or one or more data storage devices or systems, such as, for example, a disk drive, an optical disc drive, a tape drive, a solid state memory drive, etc. In certain implementations, secondary memory may be operatively receptive of, or otherwise configurable to couple to, computer readable medium 220.

As further illustrated in FIG. 2, device 102 may include one or more connections 206 (e.g., buses, lines, conductors, fibers, etc.) to operatively couple the various circuits together, and a user interface 260 (e.g., display, touch screen, keypad, buttons, knobs, speakers, etc.) to receive user input and/or provide information to the user. Device 102 may, in certain example implementations, also include a communication interface 230 (e.g., wired or wireless transceiver, modem, etc.) to allow for one-way or two-way communication with one or more other networks, devices, machines, and/or the like.

Figure 3:
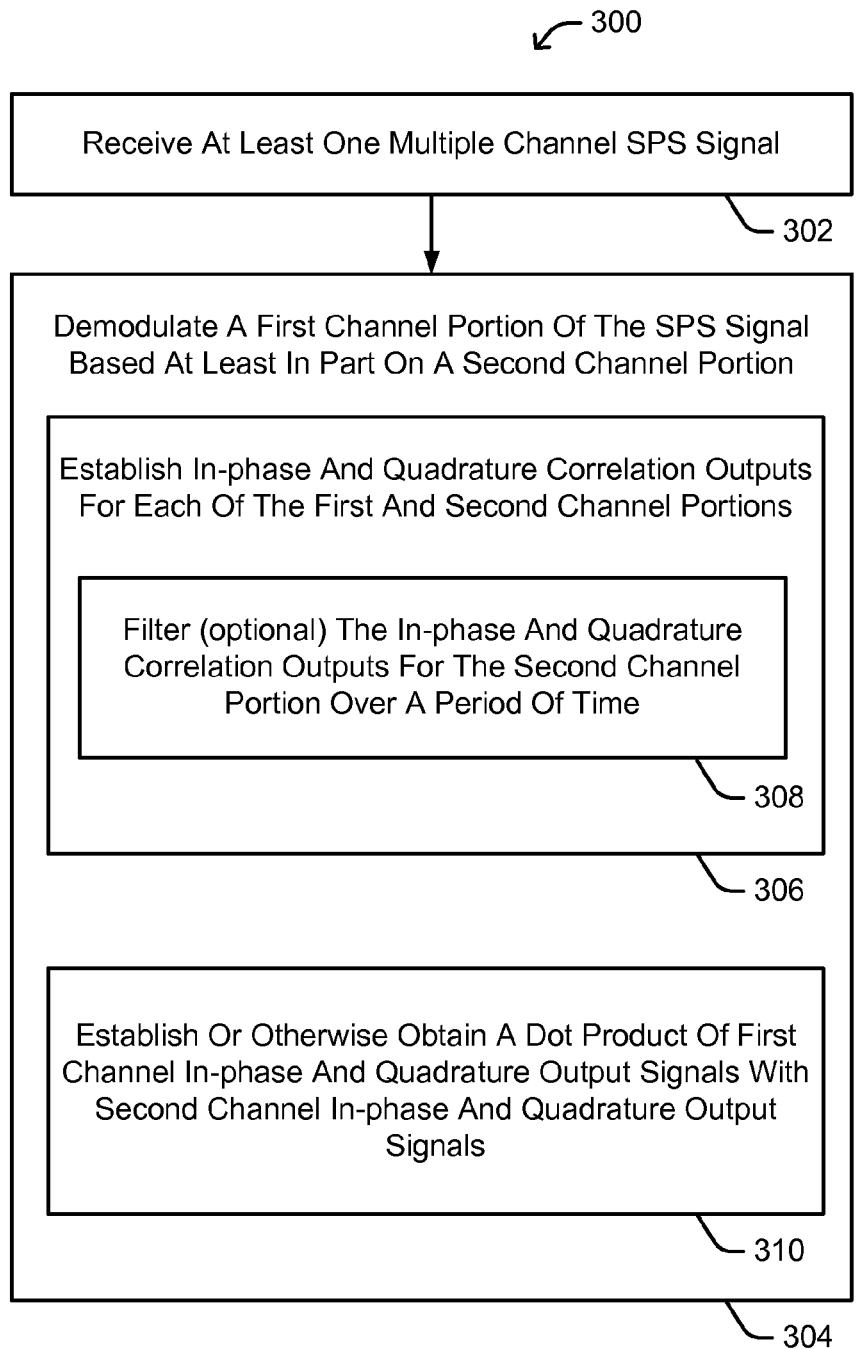
FIG. 3 is a flow diagram illustrating an exemplary process for demodulating a first channel portion of a multiple channel SPS signal using a second channel portion that may, for example, be implemented in all or part of the device of FIG. 2, in accordance with an implementation.

Attention is drawn next to FIG. 3, which is a flow diagram illustrating an exemplary process 300 for demodulating a first channel portion of a multiple channel SPS signal using a second channel portion that may, for example, be implemented in all or part of the device 102.

At block 302, at least one multiple channel SPS signal may be received. At block 304, a first channel portion of the SPS signal may be demodulated, based at least in part, on a second channel portion. For example, in certain implementations, at block 306, in-phase and quadrature correlation output signals may be established for each of the first and second channel portions. In certain implementations, at block 308, in-phase and quadrature correlation output signals associated with the second channel portion may be filtered (e.g., over a period of time). At block 310, for example, a dot product of first channel in-phase and quadrature output signals with second channel in-phase and quadrature output signals, e.g., a dot product between (DI, DQ) and (PI, PQ) may be established and/or used in demodulating and/or otherwise obtaining the first channel portion and recover SPS data (e.g., a data sequence, symbol) therein. In certain examples, the second channel data used in such a dot product may be filtered.

Example Demodulation Technique for Multiple Channel SPS Signals

In the following example a first channel portion is referred to simply as a data channel and a second channel portion as a pilot channel. In this example demodulation technique, the pilot channel may be employed to demodulate the data channel.

One may, for example, define the receiver output signals for the data and pilot channels, respectively, as:

$$D_{I_k} = (A_D \cdot b_k \cdot \cos \phi_k + n_{DI_k})$$

$$D_{Q_k} = (A_D \cdot b_k \cdot \sin \phi_k + n_{DQ_k})$$

$$P_{I_k} = (A_P \cdot \cos \phi_k + n_{PI_k})$$

$$P_{Q_k} = (A_P \cdot \sin \phi_k + n_{PQ_k}) \quad (5)$$

$A_D$ and $A_P$ are used to distinguish the potentially different powers allocated to pilot and data channels. As can be seen, the pilot channel is not modulated by the data sequence $b_k$. Subscripts have been added to distinguish the noise terms between pilot and data channels. The phase, $\phi_k$, is now identical between pilot and data channels, assuming the pilot channel accumulations span the same duration of received samples as the accumulations on the data channel. One may now demodulate symbols directly using the pilot via:

$$\begin{aligned}
SecondPortionAidedDot_k &= D_{Ik} \cdot P_{Ik} + D_{Qk} \cdot P_{Qk} \quad (6)\\
&= (A_D \cdot b_k \cdot \cos\varphi_k + n_{DIk}) \cdot \\
&\quad (A_P \cdot \cos\varphi_k + n_{PIk}) + \\
&\quad (A_D \cdot b_k \cdot \sin\varphi_k + n_{DQk}) \cdot \\
&\quad (A_P \cdot \sin\varphi_k + n_{PQk}) \\
&= A_D \cdot A_P \cdot b_k (\cos^2\varphi_k + \sin^2\varphi_k) + N''' \\
&= A_D \cdot A_P \cdot b_k + N'''
\end{aligned}$$

Carefully comparing the differential dot product from Equation (3) to the second portion aided dot product above, one will find that the equations are quite similar in terms of the noise (N is essentially the same as N'").

One can now see that the second portion aided dot product calculation should be superior whenever the pilot channel has more power than the data channel ($A_P > A_D$), since $A_D \cdot A_P > A_D^2$.

An additional advantage of this technique is the flexibility afforded by the pilot channel. For example, pilot symbols used to demodulate the current data symbol may be based on pilot information that is both concurrent with and prior to the data symbols. For example, one or more prior pilot observations can be filtered/smoothed and then used in the above calculation. Assuming the pilot phase is relatively constant over this "smoothing interval", the result should be to reduce (e.g., average down) the noise in the estimate, which may result in an improved SNR in the pilot symbols relative to the data symbols. For example, a simple first order IIR filter and/or other like filter(s) may be employed to smooth the pilot symbols:

$$fP_{I\,k} = \alpha \cdot P_{I\,k} + (1-\alpha) \cdot fP_{I\,k-1}$$

$$fP_{Q\,k} = \alpha \cdot P_{Q\,k} + (1-\alpha) \cdot fP_{Q\,k-1} \quad (7)$$

Here, for example, a loop gain α may be selected to set a desired filter time constant, which may be reflective of one or more desired filter characteristics (e.g., stability, jitter, time to close, channel coherence time, etc.). In certain example implementations, a longer coherent integration (e.g., beyond that of the bit duration) may be employed on the pilot channel. In short, there are many techniques that may be applied to an un-modulated pilot channel to improve the SNR of the pilot symbols therein relative to the SNR of the associated data symbols. Such techniques may result in an improved SNR in the second portion aided dot product, for example, relative to the conventional differential dot product from Equation (3).

In moving or fading scenarios, or even changes in the orientation of a stationary SPS receiver, a carrier phase of the received signal may change over time. Local oscillator drift and other device effects may also result in phase changes between current data symbols to be demodulated and a phase in a historical pilot data. As such, for example, it may be beneficial to have the pilot information "filtered" in some manner (e.g., integrated, filtered, averaged, smoothed, etc.) to span at least an interval back in time where the carrier phase is relatively constant and consistent with the data symbols to be demodulated. Otherwise, in certain situations, the filtered pilot symbols used to demodulate the data symbols may not provide a proper estimate of $\phi_k$ as a demodulation reference. Clearly, the example differential detector described above (see Equation (3)) assumes that a received signal carrier phase is substantially constant over at least 40 ms, e.g., here the span of the current and previous data symbols. Thus, one could clearly "smooth" the pilot information (e.g., filter, average, coherently integrate, etc.) over a 40 ms interval and use the resulting smoothed in-phase and quadrature pilot estimates in Equation (6) to perform second portion aided demodulation. If the phase is substantially constant over 60 ms, then the same smoothing operations may be likewise extended, and so on. Given that the pilot channel is modulation free, any arbitrary smoothing interval may be applied as long as the phase remains relatively constant, as discussed above.

Thus, in certain example implementations, subject to a substantially constant phase constraint, the more pilot data included in the pilot smoothing process, the better the pilot noise reduction and therefore, the better the SNR improvement in the (pilot-aided) demodulated symbol.

For certain SPS signals where more power may be allocated to the data channel than the pilot channel ($A_D > A_P$), legacy coherent and/or differential data demodulation may be implemented by device 102 should the pilot smoothing techniques employed be unable to provide a desired level of compensation for the power differential.

Thus, in the above examples, second portion aided demodulation techniques has been described which may, for example, be implemented at block 306 in method 300 of FIG. 3 to perform demodulation on SPS signals having first and second channel portions. In certain situations, such techniques may be implemented a device 102 (FIGS. 1 and 2). It is believed that such techniques may, for example, outperform certain legacy coherent and/or differential data demodulation techniques, e.g., for cases where more power is allocated to the first channel portion than the second channel portion. It is also believed that, with suitable filtering/smoothing of correlation output signals (e.g., associated with the second channel portion which may be used as a reference to demodulate the first portion), such techniques may outperform certain coherent and/or differential data demodulation techniques, e.g., when the pilot and data channel powers are equal.

Methodologies described herein may be implemented by various means depending upon applications according to particular features and/or examples. For example, such methodologies may be implemented in hardware, firmware, software, and/or combinations thereof In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

Some portions of the detailed description have been presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining", "establishing", or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general purpose computer once it is programmed to perform particular functions pursuant to instructions from program software.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method for use in an electronic device, the method comprising;
receiving at least one satellite positioning system (SPS) signal comprising at least two channel portions including a first channel portion based on a first signal modulated using a SPS data sequence and a second channel portion based on a second signal that is not modulated using said SPS data sequence;
establishing a first channel in-phase correlation output signal and a first channel quadrature correlation output signal using said first channel portion;
establishing a second channel in-phase correlation output signal and a second channel quadrature correlation output signal using said second channel portion; and
determining whether second portion aided demodulation is to be utilized, wherein the second portion aided demodulation is to be utilized when a power of the second channel portion is higher than a power of the first channel portion, or when a filtering of the second channel portion is sufficient to compensate for a power differential between a higher power of the first channel portion and a lower power of the second channel portion;
in response to the determination that the second portion aided demodulation is to be utilized:
a) calculating a dot product of said first channel in-phase and quadrature correlation output signals and said second channel in-phase and quadrature correlation output signals; and
b) demodulating said first channel portion to recover said SPS data sequence based, at least in part, on said second channel portion using said dot product.

2. The method as recited in claim 1, wherein said second channel in-phase and quadrature correlation output signals are filtered over a period of time.

3. The method as recited in claim 2, wherein said period of time is greater than a bit duration associated with said first channel portion.

4. The method as recited in claim 1, wherein a transmitted power of said at least one SPS signal is allocated substantially equally between said first and second channel portions.

5. The method as recited in claim 1, wherein a transmitted power of said at least one SPS signal is allocated unequally between said first and second channel portions.

6. The method as recited in claim 1, wherein said first channel portion comprises a data channel and said second channel portion comprises a pilot channel.

7. The method as recited in claim 1, wherein said data sequence comprises SPS navigation data.

8. The method as recited in claim 1, wherein said SPS comprises at least one global navigation satellite system (GNSS).

9. An apparatus comprising;
means for receiving at least one satellite positioning system (SPS) positioning signal comprising at least two channel portions including a first channel portion based on a first signal modulated using a SPS data sequence and a second channel portion based on a second signal that is not modulated using said SPS data sequence;
means for establishing a first channel in-phase correlation output signal and a first channel quadrature correlation output signal using said first channel portion;
means for establishing a second channel in-phase correlation output signal and a second channel quadrature correlation output signal using said second channel portion;
means for determining whether second portion aided demodulation is to be utilized, wherein the second portion aided demodulation is to be utilized when a power of the second channel portion is higher than a power of the first channel portion, or when a filtering of the second channel portion is sufficient to compensate for a power differential between a higher power of the first channel portion and a lower power of the second channel portion; and
means for in response to the determination that the second portion aided demodulation is to be utilized: a) calculating a dot product of said first channel in-phase and quadrature correlation output signals with said second channel in-phase and quadrature correlation output signals; and b) demodulating said first channel portion to recover said first signal sequence based, at least in part, on said second channel portion, using said dot product.

10. The apparatus as recited in claim 9, wherein said second channel in-phase and quadrature correlation output signals are filtered over a period of time.

11. The apparatus as recited in claim 10, wherein said period of time is greater than a bit duration associated with said first channel portion.

12. The apparatus as recited in claim 9, wherein a transmitted power of said at least one SPS signal is allocated substantially equally between said first and second channel portions.

13. The apparatus as recited in claim 9, wherein a transmitted power of said at least one SPS signal is allocated unequally between said first and second channel portions.

14. The apparatus as recited in claim 9, wherein said first channel portion comprises a data channel and said second channel portion comprises a pilot channel.

15. The apparatus as recited in claim 9, wherein said data sequence comprises SPS navigation data.

16. The apparatus as recited in claim 9, wherein said SPS comprises at least one global navigation satellite system (GNSS).

17. An apparatus comprising;
an satellite positioning system (SPS) receiver to receive at least one SPS positioning signal comprising at least two channel portions including a first channel portion based on a first signal modulated using a SPS data sequence and a second channel portion based on a second signal that is not modulated using said SPS data sequence;
one or more correlators to establish a first channel in-phase correlation output signal and a first channel quadrature correlation output signal using said first channel portion and a second channel in-phase correlation output signal and a second channel quadrature correlation output signal using said second channel portion; and
a demodulator to:
determine whether second portion aided demodulation is to be utilized, wherein the second portion aided demodulation is to be utilized when a power of the second channel portion is higher than a power of the first channel portion, or when a filtering of the second channel portion is sufficient to compensate for a power differential between a higher power of the first channel portion and a lower power of the second channel portion; and in response to the determination that the second portion aided demodulation is to be utilized:
  a) calculate a dot product of said first channel in-phase and quadrature correlation output signals with said second channel in-phase and quadrature correlation output signals; and
  b) demodulate said first channel portion to recover said first signal based, at least in part, on said second channel portion using said dot.

18. The apparatus as recited in claim 17, wherein said second channel in-phase and quadrature correlation output signals are filtered over a period of time.

19. The apparatus as recited in claim 18, wherein said period of time is greater than a bit duration associated with said first channel portion.

20. The apparatus as recited in claim 17, wherein a transmitted power of said at least one SPS signal is allocated substantially equally between said first and second channel portions.

21. The apparatus as recited in claim 17, wherein a transmitted power of said at least one SPS signal is allocated unequally between said first and second channel portions.

22. The apparatus as recited in claim 17, wherein said first channel portion comprises a data channel and said second channel portion comprises a pilot channel.

23. The apparatus as recited in claim 17, wherein said data sequence comprises SPS navigation data.

24. The apparatus as recited in claim 17, wherein said SPS receiver comprises said demodulator.

25. The apparatus as recited in claim 17, wherein said SPS comprises at least one global navigation satellite system (GNSS).

26. An article comprising:
  a non-transitory computer readable medium having computer implementable instructions stored thereon implementable by one or more processing units in an electronic device to:
    access at least one received satellite positioning system (SPS) positioning signal comprising at least two channel portions including a first channel portion based on a first signal modulated using a SPS data sequence and a second channel portion based on a second signal that is not modulated using said SPS data sequence;
    access a first channel in-phase correlation output signal and a first channel quadrature correlation output signal associated with said first channel portion;
    access a second channel in-phase correlation output signal and a second channel quadrature correlation output signal associated with said second channel portion; and
    determine whether second portion aided demodulation is to be utilized, wherein the second portion aided demodulation is to be utilized when a power of the second channel portion is higher than a power of the first channel portion, or when a filtering of the second channel portion is sufficient to compensate for a power differential between a higher power of the first channel portion and a lower power of the second channel portion; and
    in response to the determination that the second portion aided demodulation is to be utilized:
      a) calculate a dot product of said first channel in-phase and quadrature correlation output signals with said second channel in-phase and quadrature correlation output signals; and
      b) demodulate said first channel portion to recover said first signal based, at least in part, on said second channel portion using said dot product.

27. The article as recited in claim 26, wherein said second channel in-phase and quadrature correlation output signals have been filtered over a period of time.

28. The article as recited in claim 27, wherein said period of time is greater than a bit duration associated with said first channel portion.

29. The article as recited in claim 26, wherein a transmitted power of said at least one SPS signal has been allocated substantially equally between said first and second channel portions.

30. The article as recited in claim 26, wherein a transmitted power of said at least one SPS signal has been allocated unequally between said first and second channel portions.

31. The article as recited in claim 26, wherein said first channel portion comprises a data channel and said second channel portion comprises a pilot channel.

32. The article as recited in claim 26, wherein said data sequence comprises SPS navigation data.

33. The article as recited in claim 26, wherein said SPS comprises at least one global navigation satellite system (GNSS).

* * * * *